Sept. 26, 1950     F. J. COZZOLI     2,523,560
FILLING MACHINE

Filed May 18, 1945     3 Sheets-Sheet 1

FIG.I.

INVENTOR
Frank J. Cozzoli
BY Harold F. Scribner
ATTORNEY

Sept. 26, 1950  F. J. COZZOLI  2,523,560
FILLING MACHINE

Filed May 18, 1945 3 Sheets-Sheet 3

INVENTOR
Frank J. Cozzoli
BY Harold F. Swinney
ATTORNEY

Patented Sept. 26, 1950

2,523,560

UNITED STATES PATENT OFFICE 2,523,560

FILLING MACHINE

Frank J. Cozzoli, Plainfield, N. J.

Application May 18, 1945, Serial No. 594,462

6 Claims. (Cl. 226—107)

The present invention relates to dispensing machines useful in the filling of vials, ampules, and like containers with a measured quantity of pharmaceutical preparation. A primary aim of the invention is to maintain in and about such machines a high degree of sterility and cleanliness, more especially in the mechanisms and parts directly contacted by the preparation being packaged.

The invention renders available a dispensing apparatus in which the measuring and dispensing elements contacted by the preparation are kept free of contamination, by association with the driving elements of the apparatus, and are so constructed and adapted as to be readily removed from the driving apparatus, for sterilization purposes.

In furthering the attainment of sterility and sterile conditions in and about the apparatus, the invention further aims to provide a simplified mechanism for machines for this purpose, that eliminates the need for an active power source, such as an electric motor and complementary driving transmission, as would tend to create unfavorable air disturbances in and about the filling system likely to cause contamination.

A further aim of the invention is to provide a dispensing apparatus capable of dispensing measured quantities of a fluid medium with accuracy and without dripping between fills, in combination with a simple means for effecting changes in the quantity dispensed to suit given requirements, i. e., dosage per vial, in cubic centimeters and fractions thereof, as the trade and usage demands.

Still a further object of the invention is to provide an apparatus capable of being operated at different speeds, i. e., number of fills per unit of time, so that, depending upon the character of the medium and unit amount thereof to be measured and dispensed, or upon the dexterity of the operator, the apparatus can be operated at an efficient rate under all normal conditions.

By way of further improvement, the invention undertakes to render available a multiple filling apparatus in which each measuring means thereof is capable of independent adjustment, whereby given quantities, in single or multiple units, of the preparation may be dispensed with a high degree of precision on each operating cycle of the apparatus.

In carrying forward the aims of the invention, it is proposed to construct the elements contacted by the pharmaceutical preparation, of materials relatively immune to attack or of being dissolved by the preparation, such as glass, stainless steel, etc. or combinations thereof, and to arrange such elements in a manner constituting a system separate from the actuating mechanisms, the latter being located preferably within a substantially closed housing. The exterior mounting of the measuring and dispensing elements affording ideal conditions that facilitate inspection, ease in removing for sterilization purposes, and/or replacement of parts when needed, and promoting efficient operation by virtue of the ease with which the operator can determine by observation the condition or status of the filling cycle at all times.

As above indicated the actuating mechanism is mounted within a substantially closed housing and comprises, essentially, one or more pneumatically operated motors, each valve-controlled for independent rate regulation, and each connected exteriorly to a pump piston platform. Preferably the motors are arranged to operate by exhausting the air from one side of their respective pistons, and when two or more air motors are embodied, all are connected in parallel whereby proper timing of their movements is attained. An anti-drip device is embodied in each filling system and each motor is constructed to act as a valve for controlling the operation of the anti-drip mechanisms.

A common control means is also provided so that, in a multiple unit filling machine so constituted, each filling unit will have completed its discharge stroke before the drop eliminator functions to remove the final drop of the preparation from the respective filling needles, and all filling units will have completed their discharge strokes as well as their intake strokes before the air motors and measuring pumps can operate on the next cycle.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1:
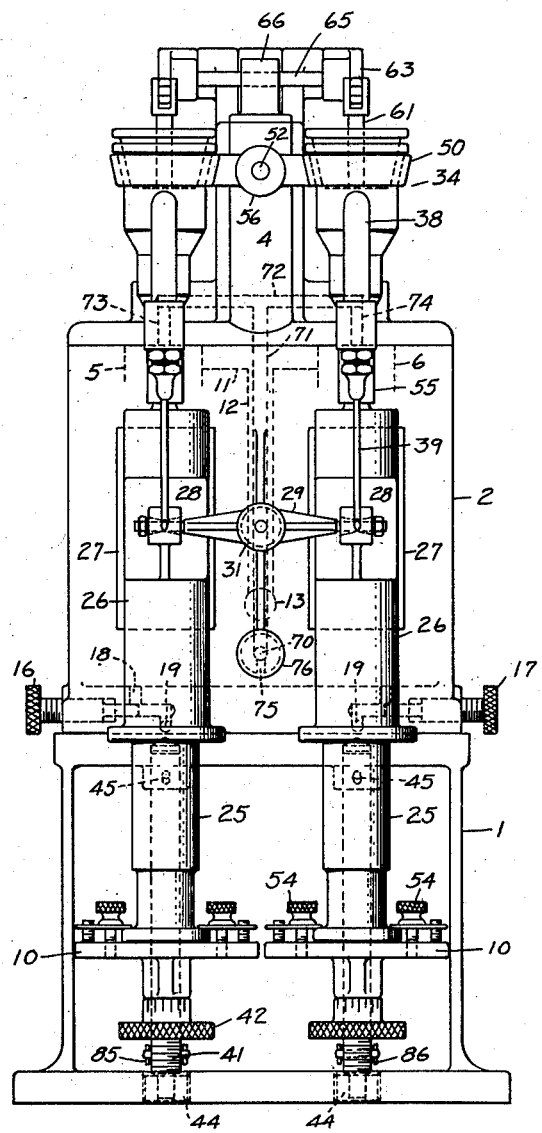
Figure 1 is a front view of a filling apparatus embodying this invention.
Figure 2:
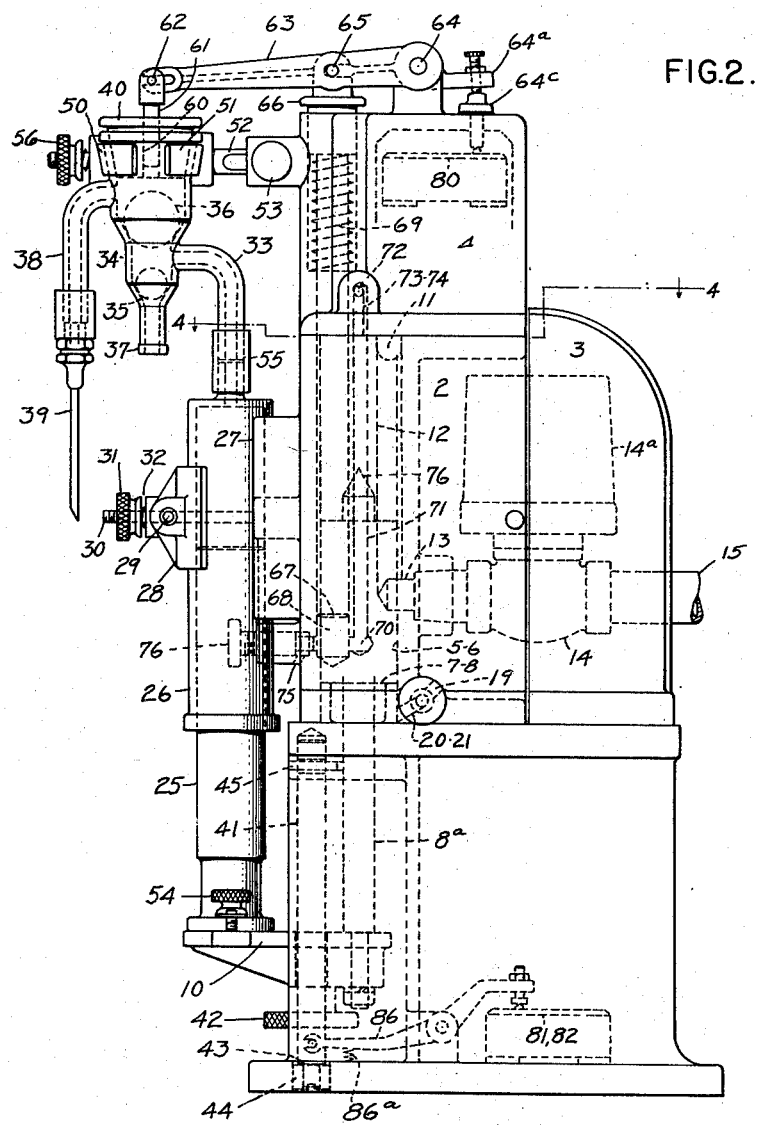
Figs. 2 and 3 are, respectively, side and plan views thereof.

Referring more particularly to Figs. 1 and 2 of the drawings, a multiple unit machine is disclosed which comprises four main castings, namely, a base member 1, a motor housing 2, a valve cover 3 and an auxiliary motor and switch housing 4, suitably bolted and pinned together, in the positions illustrated, as will be understood.

The motor housing 2 is, in this particular instance, provided with two parallel aligned motor cylinders 5 and 6 in which motor pistons 7 and 8 are slidingly fitted. Each motor piston has its piston rod 7a and 8a, extending downwardly and carries at its lower end a pump piston supporting platform 10. The upper ends of the motor cylinders 5, 6 communicate with each other via a cross-channel 11 which, in turn, communicates with a common exhaust conduit 12. The conduit 12 communicates at its lower end with an exhaust port 13 that is piped to a normally closed, magnetically operated, valve 14. Pipe line 15, also connected with the valve, leads to an exhausting system or suitable vacuum creating apparatus. When the valve 14 is opened, a low pressure is created in the cylinders 5, 6 above the pistons and the latter are lifted by the air pressure exerted upon the under sides thereof. The rate of movement of each piston is controlled by bleeder valves 16, 17 that communicate with the atmosphere through ports 18, 19 and with the interiors of the cylinders 7, 8 through ports 20, 21.

Each pump piston platform 10, mounts a pump piston 25 that is reciprocable in an inverted pump cylinder 26 clamped in a V guide 27 provided at the front of the motor housing 2. Each cylinder 26 is clamped in the guide by a self-equalizing clamp shoe 28 that is loosely mounted to a cross-bar 29. The bar 29 is mounted on a stud 30 and is spring pressed in a cylinder clamping direction by a nut 31 and spring 32. A clamp so arranged, simultaneously clamps two cylinders, equalizes the pressure and automatically compensates for any surface irregularities existing in either.

The upper and closed end of each of the pump cylinders 26 communicates via conduit 33 with a double check valve unit 34 at a point between the discharge valve 36 and inlet valve 35 thereof. The two ball check valves 35 and 36 are arranged one above the other and seat on ground conical seats. The underside of the lower valve 35 of each unit, is provided with a nipple 37 with which a connection may be made with a supply of fluid medium, and the upper side of discharge valve 36 of each unit communicates at 38 with a filling needle 39. Each valve unit is closed by a stopper 40. On a down stroke of the pump piston 25 of a given measuring unit, liquid is drawn into the cylinder 26 atop the piston via conduit 37, past valve 35, and through conduit 33; valve 36 is closed. On an up stroke of the pump piston, the liquid ahead of the piston is discharged through conduit 33, past discharge valve 36, through conduit 38 and filling needle 39; inlet valve 35 is closed. The inverted position of the pump cylinders, and the movement of the pistons upwardly to the very ends thereof on each discharge stroke, prevents accumulation and entrapment of any entrained air.

The quantity taken in and discharged on each cycle, is controlled by regulating the extent that the head end of the pump piston recedes from the closed end of the cylinder 26. A graduated and threaded stop bar 41 and a calibrated stop nut 42, for each motor and pump are provided for that purpose. Each of the bars 41 is mounted in the base 1, to have a slight endwise float, and its lower end 43 seats against a normally positive but adjustable stop 44. A pin and slot connection 45 restrains the bar 41 against turning yet allows an endwise float thereof for switch actuation as will later be explained. By adjusting the stop nut 42 to different positions vertically on the bar 41, the extent or length of intake stroke of the pump piston may be varied so as to be productive of a predetermined quantitive intake and subsequent discharge into the vial or container to be filled.

Figure 3:
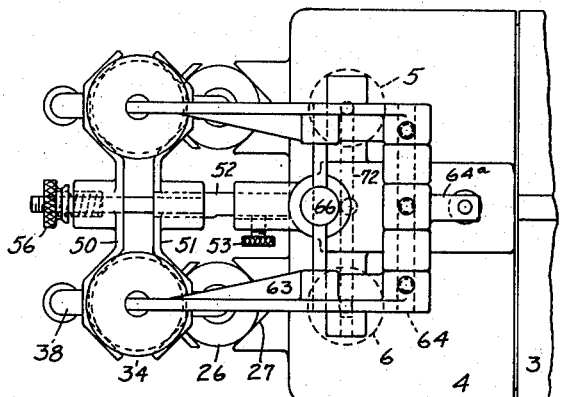
Figure 4:
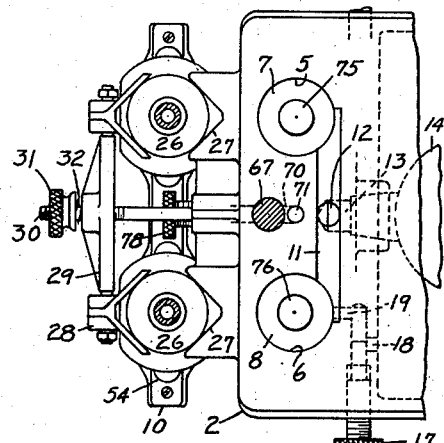
Fig. 4 is a horizontal sectional view of a portion of the machine and is taken substantially along lines 4—4 of Fig. 2.

Each of valve casings 34, is preferably made of glass, and the ball valves 35 and 36 of stainless steel and the whole assemblies mounted between equalizing spring pressed clips 50 and 51 carried upon a common stud 52 projecting from the housing 4 (see Fig. 3). Clamp screw 53 is provided for clamping the stud 52, which is axially adjustable, in position such that the connection 33 of the valves are in alignment with the pump cylinder fittings. Larger and smaller diametered pump assemblies will assume different positions laterally within the V guides 27 and hence require valve adjustment laterally in correspondence. Preferably the pump cylinders and pistons are made of glass, or combinations of stainless steel and glass, and the filling needles 39 also of non-corrosive material, such as stainless steel, to the end of maintaining all parts of the entire fluid system immune from attack by the fluids to be circulated therethrough. Such materials are also well able to withstand sterilization temperatures and other cleansing processes periodically necessary in the handling of sterile preparations. By releasing cylinder clamp screws 31 and piston clamp screws 54 and uncoupling at 55, the pump units may be easily detached and replaced, and by releasing clamp screw 56 the valve units may be detached and replaced, or others substituted therefor. Such removing and replacement of one or more elements of the circulating system, does not however, affect the pump actuating mechanism.

Figure 5:
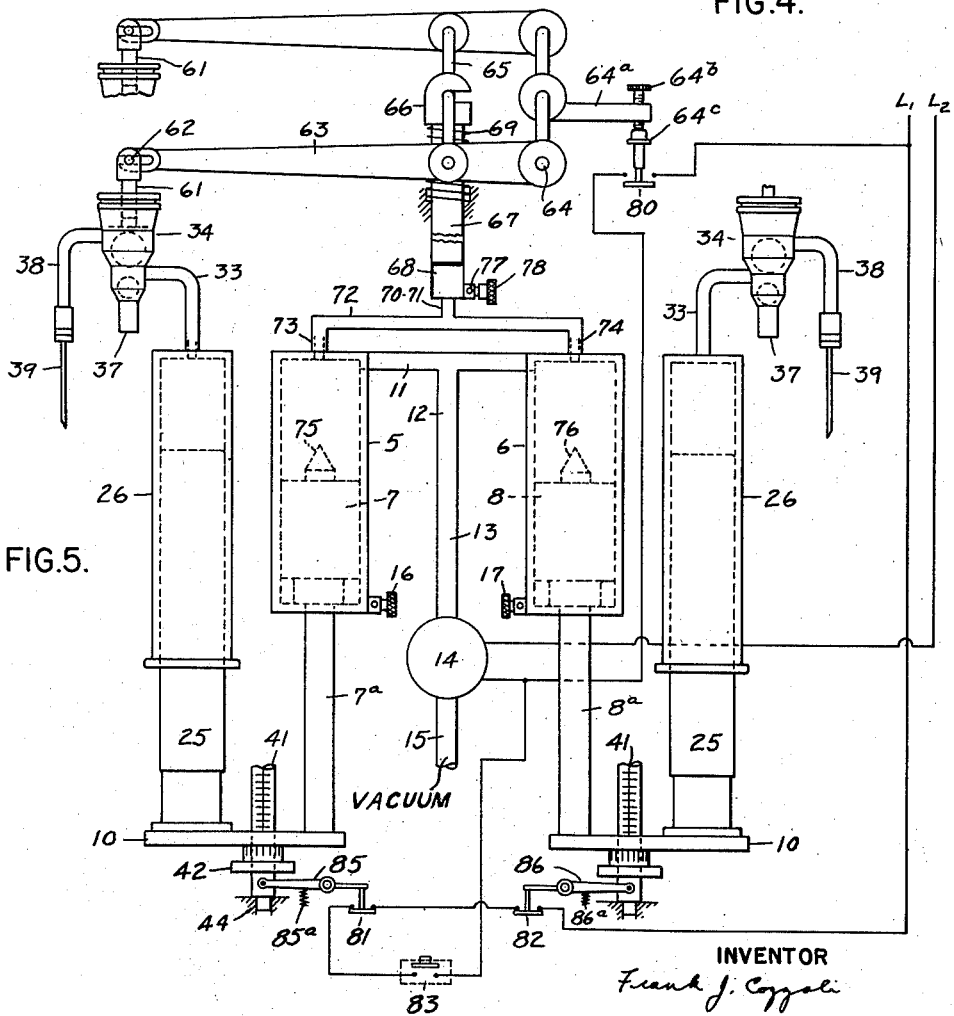
Fig. 5 is a diagrammatic view of the pump and motor systems and a preferred form of control circuit therefor.

In needle type filling machines, there is a tendency for one or more drops of the preparation being dispensed, to adhere to the end of the needle at the completion of the discharge stroke, and wasteful dripping and air contamination is inevitable. The present invention proposes a means of preventing or eliminating needle drop formation in a novel manner. Figs. 2 and 5 of the drawings illustrate the principle involved, which consists primarily in causing the discharge conduits 38 to expand slightly on the completion of the discharge strokes of the pumps. As illustrated in the drawings a preferred form of expanding means comprises an auxiliary cylinder and piston 60 and 61 embodied in the discharge conduit between the valve 36 and the discharge end of the needle 39. Normally the piston 61 occupies a definite position in the cylinder 60, or projects somewhat into the chamber occupied by the valve 36. At the conclusion of the discharge stroke of the main piston 25, the auxiliary piston 61 is caused to recede slightly, thus tending to produce a void in the discharge conduit 38, and immediately part of the contents of the discharge conduit flows back into the valve casing. That action draws the fluid away from the discharge end of the filling needle 39 and consequently no drop can form thereon.

The timing of the expansion is caused, in accordance with this invention, automatically to occur when all of the pump pistons, if there are several, reach the ends of their respective discharge strokes. As illustrated in Figs. 2, 3, and 5, the upper end of each of the auxiliary pistons 61 has a pin and slot connection 62 with levers 63 that are connected and pivoted at 64. The levers 63 are also connected intermediate their ends with a cross pin 65 that engages a slotted and enlarged end 66, of a plunger 67. A compression spring 69 underlying the enlarged end 66 normally tends to lift the plunger and levers 63 thereby to effect the lifting of the auxiliary pistons 61. The lower end of the plunger 67 fits within a bore 68 formed in the motor housing 2, which bore 68 is in communication with each of the motor cylinders 5—6, via conduits 70, 71, cross conduit 72 in the housing 4, and valve conduits 73 and 74 aligned with each motor cylinder. When the magnetic valve 14 is open, air is exhausted not only from the main motor cylinders 5—6, but also from the auxiliary motor cylinder 68 by way of conduits 70, 71, 72, 73 and 74. The low pressure thus created in cylinder 68, causes the plunger 67 to drop, and hence a corresponding lowering of the auxiliary pistons 61 associated with each pump discharge conduit. The lowering of the piston 61, is definitely limited by the enlarged end 66 of the plunger engaging the housing 4, whereas, movement in the opposite direction is limited by the adjustment given to a screw 64ᵇ, in the lever 64ᵃ, that engages a switch actuating pin 64ᶜ.

Each motor piston carries a valve stem 75—76, aligned with valve conduits 73, 74 respectively, and as each motor piston reaches its corresponding seat in valve conduit 73 or 74 it closes same to further exhausting therethrough. When both valve conduits 73, 74 are closed, the air is no longer being exhausted from cylinder 68. An artificially created in-leakage of air into cylinder 68, allows the plunger 67 to raise under the influence of the spring 69. The in-leakage of air may be through a fixed orifice, but preferably through a variable orifice 77 controlled by a valve stem 78. The capacity of the suction means is, during normal operation, sufficiently great as to create the requisite low pressure in the cylinder 68, even though valve 77—78 is partly open.

It will be noted that the plunger 67 does not raise until both of the motor pistons are fully elevated and their valve stems 75, 76 close off their respective conduits 73, 74. When that occurs both pump cylinders will have completely discharged their contents. Accordingly, when plunger 67 is free to rise, the discharge strokes are complete, and the subsequent recession of auxiliary pistons 61 expands each of the discharge conduits 38 sufficiently to eliminate the formation of, or the adherence of, drops at the ends of the filling needles.

The parts of the apparatus remain in the position last mentioned until the magnetic valve is again closed and cuts off the suction power, whereupon the motor pistons 7—8 and pump piston 25 fall by gravity and the latter take in a new charge of the preparation. The operation of the magnetic valve 14 is controlled in part manually and in part automatically. Figs. 2 and 5 illustrate a control system wherein lines $L_1$ and $L_2$ are the power lines, one of which connects with the solenoid of the magnetic valve 14. Numerals 80, 81, and 82 indicate micro-switches, and numeral 83 a foot operated switch. The micro-switches are normally spring pressed to a closed position, whereas, the foot switch 83 is spring pressed to open position. The switch 80 is actuated to an open position by a lever 64ᵃ secured to the shaft 64, and responds to the actuation of the plunger 67. Switches 81 and 82 are actuated by levers 85 and 86 that have a pin and slot connection with the stop bars 41. When both of the pump and motor pistons are resting upon the adjusting nuts 42, the respective bars 41 are fully seated on the base, and the switch levers 85, 86 rocked to a position whereat switches 81 and 82 are closed. As illustrated in Fig. 5, the switches 81, 82 and 83 are in series with each other and with the valve 14, and if both pump pistons are "down," the closing of the foot switch 83 will effect opening of the valve 14. As soon as sufficient vacuum is produced in the motor cylinders 5, 6 and in 68, the plunger 67 will move in, against the power of spring 69, and the pistons 7—8 will move "up." Pump pistons 25 are thus propelled on their discharge strokes.

The evacuation of cylinder 68 and the lowering of plunger 67 effects a counterclockwise actuation of the switch lever 64ᵃ, and micro-switch 80 closes and completes a parallel circuit to solenoid 14ᵃ of the valve 14. The foot switch 83 may thereafter be released. The initial movement of the pump and motor pistons, removes the weight from the stop bars 41 and the latter lift slightly, under the action of springs 85ᵃ, 86ᵃ, and the switches 81, 82 open. As each pump completes its discharge stroke, its associated motor piston closes its valve port (73 or 74) leading to plunger cylinder 68, and when both ports 73, 74 are closed, further exhausting of the cylinder 68 is prevented. Air continues to bleed in through the bleeder valve 75, 76 and the plunger 67 is lifted by its spring 69. As before explained the upward movement of the plunger 67 actuates the drop eliminator piston 61 associated with each discharge conduit, and simultaneously rocks lever 64 clockwise to open the holding switch 80. When the latter occurs, the magnetic valve 14 closes and cuts off the suction to the motor cylinders and the pistons thereof, as well as the pump pistons, lower themselves by gravity and new charges are drawn into the pump cylinders 26. The rate of descent of the pump and motor pistons is regulated by the rate of in-leakage through valve 75, 76 and the rate of exhaust through valves 16 and 17. If desired the valves 16 and 17 may be of the type offering a restricted flow upon the upstroke, and a more free flow on the down stroke. It will be observed that any in-leakage, or leakage past the pistons, of this system promotes, rather than interferes with, smoothness in motor operation, in both directions of movement. Care should be taken, however, that the vacuum producing apparatus be large enough or have the capacity to produce and maintain the desired degree of pressure differential to obtain piston movement notwithstanding leakages.

As each motor and pump piston on its downward stroke engages its respective stop nut 42, wherever it may be adjusted on the bar 41, the stop bar 41 moves slightly downward and comes to a fixed stop. Switch lever 85 (or 86) is thereby actuated, and the switch 81 (or 82) closes. The discharging cycle cannot again be instituted until both pump pistons have completed their intake strokes.

Thus it will be seen that the present system insures completeness in the discharge stroke of each of a multiplicity of plungers before the intake strokes can be instituted, and insures completeness in the intake strokes of all measuring units, before the discharge strokes can be instituted. And these results are attained irrespective of the adjusted capacities of the various measuring units or variations in stroke lengths necessitated by differences in pump diameters.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. Dispensing apparatus combining a plurality of pumps and an air operated motor connected with each pump for actuating said pumps, each of said pump means having valve controlled inlet and discharge conduits for directing the liquid to be dispensed thereto and therefrom, and each of said motors comprising piston and cylinder elements and means for effecting a differential in air pressure on opposite sides of said pistons whereby to effect relative movement between said pistons and cylinders in one direction, valve means operatively associated with each air motor for controlling its rate of operation in said direction, means including the piston elements of the associated motors for effecting pump actuation in the opposite direction, and control means common to all of said air motors for maintaining the said pressure differential effective on each motor until all of said motors have actuated their respective pumps through a single discharge cycle.

2. The combination set forth in claim 1 including control means responsive to the movements of said pumps in said opposite direction for rendering ineffective said means for effecting a pressure differential on the motors until all of said pumps have completed their movements in said opposite direction.

3. Multiple unit dispensing apparatus having a plurality of measuring cylinders and cooperating plungers, a supply and a discharge conduit connected with each of said cylinders, valve means in said conduits operative to direct a flow of fluid to and from the associated cylinder during an operating cycle, in combination with pneumatically operated means for actuating said plungers independently comprising a cylinder element and a piston element slidable therein associated with each measuring cylinder and plunger, a valve controlled conduit communicating with all of said cylinder elements at one side of the pistons therein and adapted to be connected with a source of pressure lower than atmospheric, additional conduit means communicating with the interior of each of said cylinder elements at the other side of the respective pistons therein and with the atmosphere for determining the rate of piston movement, means connecting each of said measuring cylinder plungers with a selected piston element so as to be propelled thereby, and means operative at the conclusion of movement of all of said measuring plungers to a predetermined position to effect closing of said valved conduit and thereafter the return of said piston elements to their initial positions.

4. Dispensing apparatus combining a pump of the expansible chamber type and valved supply and discharge conduits connected therewith for conducting liquid medium to and from the chamber of said pump, and air motor and connections therewith for operating said pump on its discharge cycle thereof, means for effecting actuation of said pump on its intake cycle, a supplementary pump comprising a piston and cylinder arranged in open communication with the discharge conduit of said first named pump at a point beyond the valve means therein, and means controlled by said air motor and operative at the conclusion of the discharge cycle of said first named pump and prior to the actuation of said first named pump on a pump intake cycle to actuate said supplementary pump in a direction tending to entrain in the cylinder thereof a portion of the liquid remaining in the pump discharge conduit.

5. An apparatus for measuring and dispensing two or more units of a pharmaceutical preparation simultaneously comprising in combination a plurality of pumping systems and a motor system associated with each for actuating same, each of said pumping systems being separately detachable from the apparatus and comprising a piston and cylinder and valve controlled inlet and discharge conduits connected therewith, each of said motor systems comprising a piston and cylinder and valve controlled conduits connected therewith, means for effecting a difference in pressure at opposite sides of the pistons of all of the motor systems simultaneously whereby to effect piston movements concurrently, power transmitting connections between each of said motors and its associated pump system, supplementary and normally inoperative pump means communicating with the discharge conduit of each of said pump systems, and means operative at the conclusion of the discharge strokes of the pistons of all of said pump systems automatically to effect actuation of the said supplementary pump in a direction to entrain a portion of the preparation remaining in the respective discharge conduits.

6. Liquid dispensing apparatus combining a pump having a piston and cylinder and valve controlled intake and discharge conduits, an air operated main motor connected to the pump piston for actuating same in a discharge direction, an auxiliary piston and cylinder mechanism connected with said discharge conduit at the outgoing side of the valve therein, an auxiliary air operated motor having a piston and a cylinder operative normally to maintain said auxiliary piston in a projected position, means including exhausting conduits connected to each motor cylinder for creating a pressure lower than an atmosphere in the cylinders of said main motor and said auxiliary motor at one side of the respective pistons thereof thereby to cause movement of the respective pistons and pump operation, valve means controlled by the movement of the piston of said main motor for closing the exhausting conduit of the auxiliary motor at a given point in the travel of the said main motor piston, and means thereafter operative to effect movement of said auxiliary piston to a retracted position thereby to cause a portion of the fluid in the pump discharge conduit to be entrained in the cylinder of the auxiliary pump.

FRANK J. COZZOLI.

REFERENCES CITED

The following references are of record in the file of this patent:

UNITED STATES PATENTS

| Number | Name | Date |
|---|---|---|
| 933,361 | Champ | Sept. 7, 1909 |
| 1,488,171 | Savidge | Mar. 25, 1924 |
| 1,775,946 | Reid | Sept. 16, 1930 |
| 2,150,760 | Cozzoli | Mar. 14, 1939 |
| 2,210,971 | Bronson | Aug. 13, 1940 |
| 2,356,428 | Ranney | Aug. 22, 1944 |

FOREIGN PATENTS

| Number | Country | Date |
|---|---|---|
| 32,715 | Denmark | Jan. 3, 1924 |
| 521,504 | Great Britain | May 23, 1940 |